US012675505B1

(12) United States Patent
Patel et al.

(10) Patent No.: US 12,675,505 B1
(45) Date of Patent: Jul. 7, 2026

(54) MODEL EXPLORATION FOR GROUPED DATASETS

(71) Applicant: International Business Machines Corporation, Armonk, NY (US)

(72) Inventors: Dhavalkumar C. Patel, White Plains, NY (US); Jayant R. Kalagnanam, Briarcliff Manor, NY (US); Robert Jeffrey Baseman, Brewster, NY (US); Chandrasekhara K. Reddy, Kinnelon, NJ (US); Fateh A. Tipu, Wappingers Falls, NY (US); Dung Tien Phan, Pleasantville, NY (US); Nam H. Nguyen, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/013,257

(22) Filed: Jan. 8, 2025

(51) Int. Cl.
  *G06F 16/00* (2019.01)
  *G06F 9/54* (2006.01)
  *G06F 16/28* (2019.01)

(52) U.S. Cl.
  CPC ............. *G06F 16/285* (2019.01); *G06F 9/542* (2013.01)

(58) Field of Classification Search
  None
  See application file for complete search history.

(56) References Cited

U.S. PATENT DOCUMENTS 10,990,568 B2 4/2021 Ormont et al.
11,176,175 B1 * 11/2021 Snyder .................. G06F 16/254

11,514,402 B2 11/2022 Wadhwa et al.
11,557,136 B1 * 1/2023 Zimmermann .... G06V 30/1916
12,061,963 B1 * 8/2024 Bansal ...................... G06N 5/01
2013/0066913 A1 * 3/2013 Flasko ................... G06Q 30/02
  707/E17.143
2014/0280193 A1 * 9/2014 Cronin ................ G06F 16/2228
  707/741
2017/0359361 A1 * 12/2017 Modani ............... H04L 63/1416
2017/0364538 A1 * 12/2017 Jacob ................. G06F 16/252
2019/0362222 A1 * 11/2019 Chen ........................ G06N 3/08
2019/0370266 A1 * 12/2019 Jacob .................... G06F 16/258
2020/0074325 A1 3/2020 Lo et al.
(Continued)

FOREIGN PATENT DOCUMENTS

CN 111950622 B 8/2023

*Primary Examiner* — Hasanul Mobin
(74) *Attorney, Agent, or Firm* — Samuel A. Waldbaum

(57) ABSTRACT

An embodiment includes creating, by a system, a first dataset and a second dataset from a group of datasets by performing a skyline operation of a feature extracted from the group of datasets. The embodiment includes updating a pipeline metric in a pipeline store by orchestrating an automated modeler based on the first dataset where responsive to the updating an event notification message is transmitted. The embodiment includes detecting that the pipeline metric has been stored in the pipeline store based on the event notification message. The embodiment also includes responsive to the event notification message, creating a search space according to a criterion applied to the pipeline store and orchestrating the automated modeler according to the search space and the second dataset where the system models the first dataset and the second dataset individually and the second dataset is modelled based in part on the pipeline metric.

20 Claims, 5 Drawing Sheets

(56)          References Cited

U.S. PATENT DOCUMENTS

| | | | |
|---|---|---|---|
| 2020/0097845 A1* | 3/2020 | Shaikh | G06Q 30/0201 |
| 2020/0278986 A1* | 9/2020 | Guha | G06F 16/285 |
| 2020/0293391 A1* | 9/2020 | Poole | C22C 38/44 |
| 2021/0029248 A1* | 1/2021 | Scodary | G06F 16/683 |
| 2021/0304059 A1* | 9/2021 | Bigaj | G06N 3/045 |
| 2023/0094000 A1* | 3/2023 | Meliksetian | G06N 5/01 |
| | | | 702/3 |
| 2023/0229492 A1* | 7/2023 | Rakshit | G06F 9/4881 |
| | | | 718/103 |
| 2023/0281364 A1 | 9/2023 | Phan et al. | |
| 2023/0344937 A1* | 10/2023 | Scodary | G06F 40/30 |
| 2023/0370350 A1* | 11/2023 | Oglesby | H04L 43/0805 |
| 2024/0169253 A1 | 5/2024 | Phan et al. | |

* cited by examiner

Figure 4:
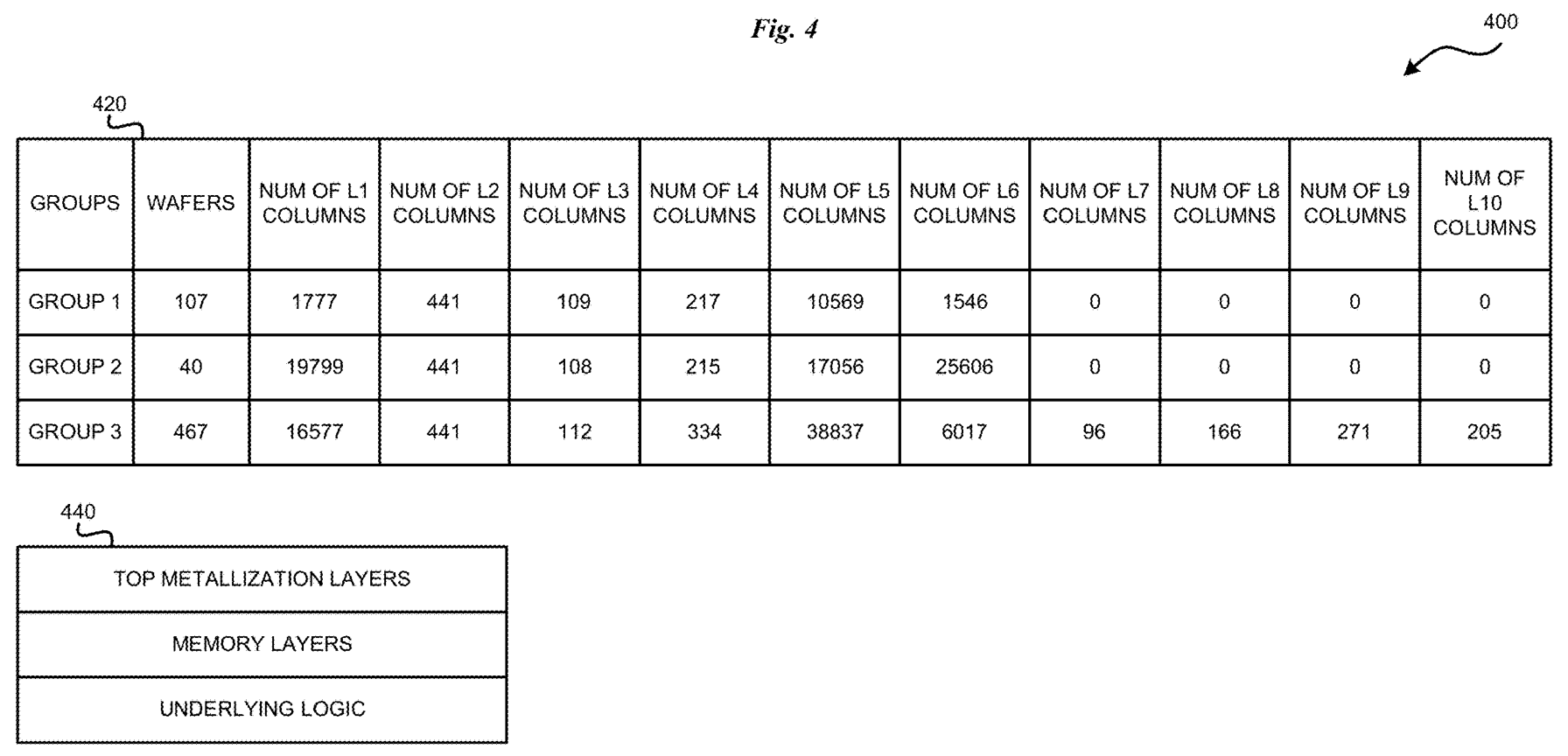

400

| GROUPS | WAFERS | NUM OF L1 COLUMNS | NUM OF L2 COLUMNS | NUM OF L3 COLUMNS | NUM OF L4 COLUMNS | NUM OF L5 COLUMNS | NUM OF L6 COLUMNS | NUM OF L7 COLUMNS | NUM OF L8 COLUMNS | NUM OF L9 COLUMNS | NUM OF L10 COLUMNS |
|---|---|---|---|---|---|---|---|---|---|---|---|
| GROUP 1 | 107 | 1777 | 441 | 109 | 217 | 10569 | 1546 | 0 | 0 | 0 | 0 |
| GROUP 2 | 40 | 19799 | 441 | 108 | 215 | 17056 | 25606 | 0 | 0 | 0 | 0 |
| GROUP 3 | 467 | 16577 | 441 | 112 | 334 | 38837 | 6017 | 96 | 166 | 271 | 205 |

420

| |
|---|
| TOP METALLIZATION LAYERS |
| MEMORY LAYERS |
| UNDERLYING LOGIC |

FEATURE EXTRACTION
520

PIPELINE ANALYZER
540

SEARCH SPACE BUILDER
560

AUTOMATIC ML
570

DATA STORE
580

CPU/GPU
590

MODEL EXPLORATION FOR GROUPED DATASETS

BACKGROUND

The present invention relates generally to machine learning. More particularly, the present invention relates to a method, system, and computer program for Model Exploration for Grouped Datasets.

Artificial intelligence (AI) technology has evolved significantly over the past few years. Modern AI systems are achieving human level performance on cognitive tasks like converting speech to text, recognizing objects and images, or translating between different languages. This evolution holds promise for new and improved applications in many industries.

Datasets are a vital component of machine learning. For example, large language models often train on billions of text examples to capture the richness of language and datasets for image processing contain millions of images across thousands of categories. Advanced automated machine learning (AutoML) techniques are needed to sustain the trajectory of AI, given the increasing number and complexity of AI datasets and applications. The future of scalable AI lies in automation, particularly when it comes to machine learning (ML). AutoML automates the time-consuming process of AI optimization and address ML bottlenecks that prevent the scaling of AI innovations.

SUMMARY

The illustrative embodiments provide for Model Exploration for Grouped Datasets. An embodiment includes creating, by a system, a first dataset and a second dataset from a group of datasets by performing a skyline operation of a feature extracted from the group of datasets. The embodiment includes updating a pipeline metric in a pipeline store by orchestrating an automated modeler based on the first dataset wherein responsive to the updating an event notification message is transmitted. The embodiment includes detecting that the pipeline metric has been stored in the pipeline store based on the event notification message. The embodiment also includes responsive to the event notification message, creating a search space according to a criterion applied to the pipeline store and orchestrating the automated modeler according to the search space and the second dataset wherein the system models the first dataset and the second dataset individually and the second dataset is modelled based in part on the pipeline metric.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 4 depicts a use case diagram of a model exploration of grouped datasets in accordance with an illustrative embodiment.

DETAILED DESCRIPTION

Figure 1:
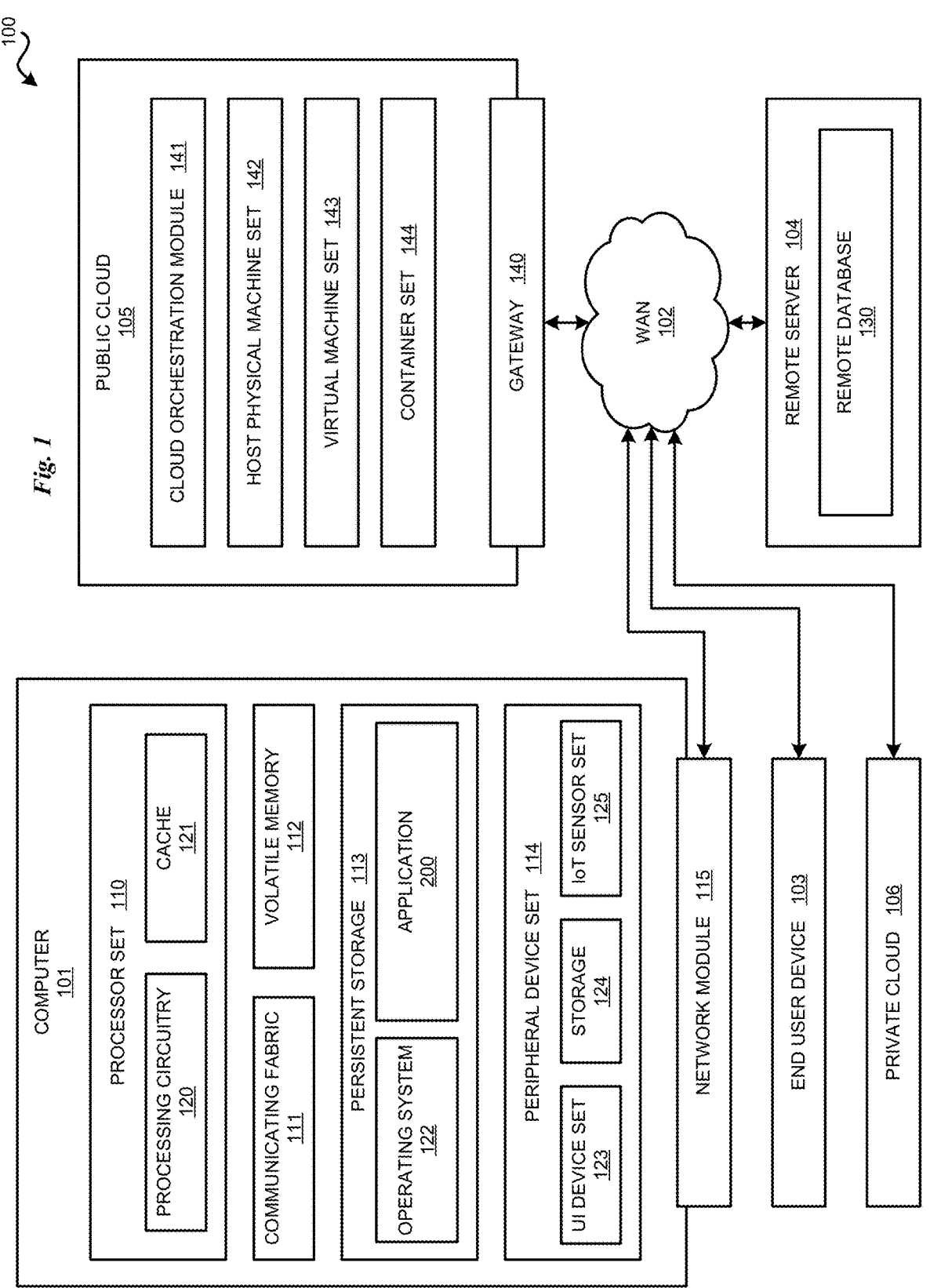
FIG. 1 depicts a block diagram of a computing environment in accordance with an illustrative embodiment.

Datasets are a vital component of machine learning. In machine learning, "data-centric features" focus on the quality and characteristics of the features (data attributes) used to train a model, prioritizing data improvement and manipulation techniques to enhance model performance rather than solely optimizing the model architecture itself. This means actively managing and refining the data in the datasets to ensure the model effectively captures the relevant information needed for accurate predictions. For example, large language models often train on billions of text examples to capture the richness of language and datasets for image processing contain millions of images across thousands of categories. Furthermore, the input dimensions of each dataset can number thousands or more features. This is not sustainable given the increasing volume and complexity of AI applications. Automation is necessary to facilitate the highly iterative process of optimization and make development scalable.

Advanced automated machine learning (AutoML) techniques are needed to sustain the trajectory of AI, given the increasing number and complexity of AI applications. It allows a system to provide a dataset as input and receive an optimized model as output. However, AutoML only works with a single dataset at a time, are optimized for a single target, and do not support cross learning across different models and/or datasets. AutoML processes also suffer from performance and resource inefficiencies as the size of the dataset increases and the relationships between the data points become more complex.

Currently there is no way to provide simultaneous automatic modeling of each dataset in a group of multiple datasets and exploiting commonality across datasets to support cross learning in an efficient operational setting. These current limitations make it impossible to provide efficient, cost-effective and self-aware services, pertaining specifically to efficiency of the algorithms and optimizes the AI models for deployment on various types of hardware, such as CPUs and GPUs. to end users. As a result, current efforts in this regard are inefficient and ineffective.

The present disclosure provides a process (as well as a system, method, machine-readable medium, etc.) for Model Exploration for Grouped Datasets. For the sake of clarity of the description, and without implying any limitation thereto, the term "model" as used herein may refer to machine learning to enable computers and machines to make a prediction or classification based on some input data, which can be labeled or unlabeled. Machine learning models may comprise of supervised learning, unsupervised learning and semi-supervised learning. The term "model exploration" may refer determining which features in the dataset have the most significant impact on the model's predictions, to the process of analyzing and investigating a trained machine learning model to understand how it makes predictions, identify its strengths and weaknesses, and gain insights into the underlying patterns it has learned from the data, often including examining its decision-making process and the influence of different features on the model's output. Insights gained from exploration can guide further model development and hyperparameter tuning.

Embodiments disclosed herein describe the system as comprising a pipeline store such as a graph database, a graphical user interface component, a feature extractor component, a pipeline analyzer component, a search space builder component, an automated modeler orchestrator component, an automated modeler component, a prediction component, a feedback component, and a recommendation component. It should be understood that the functions of the various components may be combined to result in fewer components. For example, in some embodiments, the pipeline analyzer component, the search space builder component may be combined into one component. Embodiments disclosed herein describe a machine learning component as using a machine learning algorithm to perform machine learning tasks including but not limited to predicting, clustering, and regression.

Embodiments disclosed herein describe "automated modeler" which may refer to an automated machine learning (AutoML), a process that automates the application of machine learning to real-world problems. The process can be used to build machine learning models for a variety of tasks, including classification, forecasting, regression, computer vision, and natural language processing (NLP). Embodiments disclosed herein describe "pipeline" which may refer to a AutoML process including algorithm selection, adaptive data reduction (feature and sample size selection), and hyperparameter optimization.

Embodiments disclosed herein describe "an automated modeler orchestrator component" which may refer to a computer process or hardware configured to connect, instantiate, deploy, execute and/or orchestrate the automated modeling of the datasets in multiple automated modeler compute nodes in serial or in parallel depending on factors such as system resources and/or priority of the task. In some embodiments, the automated modeler orchestrator component may connect to an automated modeler compute node over a network or shared memory.

In embodiments illustrated herein, the system detects a group of datasets from data sources of the network where the dataset may comprise of data collected from monitoring network component in a variety of data formats including Extensible Markup Language (XML), binary stream, hexadecimal, Hypertext Markup Language (HTML) and other structured and unstructured data formats.

Illustrative embodiments disclosed herein describe creating, by a system, a first dataset and a second dataset from a group of datasets by performing a skyline operation of a feature extracted from the group of datasets. Embodiments disclosed herein describe a "skyline operation" which may refer to a known computation given a dataset, a skyline operation returns the objects that cannot be dominated by any other objects. In other words, the skyline operation optimizes a d-dimensional dataset in that the dataset contains the points that are not dominated by any other point on all dimensions.

Embodiments disclosed herein describe a "feature" which may refer to a measurable characteristic or property of a dataset, also known as a dimension, that is used as input data to train a machine learning model. They are the predictor variables that determine a model's output. They may also be called input variables. High-dimensional data denotes any dataset with a large number of predictor variables.

Illustrative embodiments disclosed herein describe a dataset which may comprise an instructional material including text, audio, visual media for use in machine learning. Text media includes printed and displayed text such as textbooks, pamphlets, handouts, study guides, manuals, blackboard and whiteboard. Audio media refers to human voice and sounds. Visual media may include charts, real objects, photographs, transparencies, slides, tapes, films, filmstrips, television, video, and multimedia.

Illustrative embodiments disclosed herein describe updating a pipeline metric in a pipeline store by orchestrating an automated modeler based on the first dataset wherein responsive to the updating an event notification message is transmitted. Embodiments disclosed herein describe a "pipeline metric" which may refer to a measurable property of a pipeline of an automated modeler process. The term "event notification message" described in embodiments herein may refer to a binary word or bits written/read from a shared memory by the system that indicate the occurrence of a measurable event such as the instantiation of an automated modeler task by the automated modeler orchestrator, the completion of the automated modeler task and/or the storing of a pipeline metric in the pipeline store.

Illustrative embodiments disclosed herein describe detecting that the pipeline metric has been stored in the pipeline store based on the event notification message. Embodiments disclosed herein describe "detecting" which may refer to monitoring a network or memory or other computer resources for a measurable property.

Embodiments disclosed herein describe "estimator" which may refer to a machine learning component to estimate unknown parameters or functions based on observed data. An estimator may consist of a hypothesis space, a loss function, and an optimization algorithm. Embodiments disclosed herein also describe "transformer" which may mean a known neural network that learns context and thus meaning by tracking relationships in sequential data like the words in a sentence.

Illustrative embodiments disclosed herein also describe responsive to the event notification message, creating a search space according to a criterion applied to the pipeline store and orchestrating the automated modeler according to the search space and the second dataset wherein the system models the first dataset and the second dataset individually and the second dataset is modelled based in part on the pipeline metric. Embodiments disclosed herein describe a "search space" that in the context of machine learning, is an implicitly- or explicitly-defined collection of machine learning pipelines.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Data center environment 100 contains an example of an environment for the execution of at least some of the computer code involved in performing the inventive methods, such as an Application module 200 that provides Model Exploration for Grouped Datasets. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made. Available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of Application Programming Interfaces (API). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Figure 2:
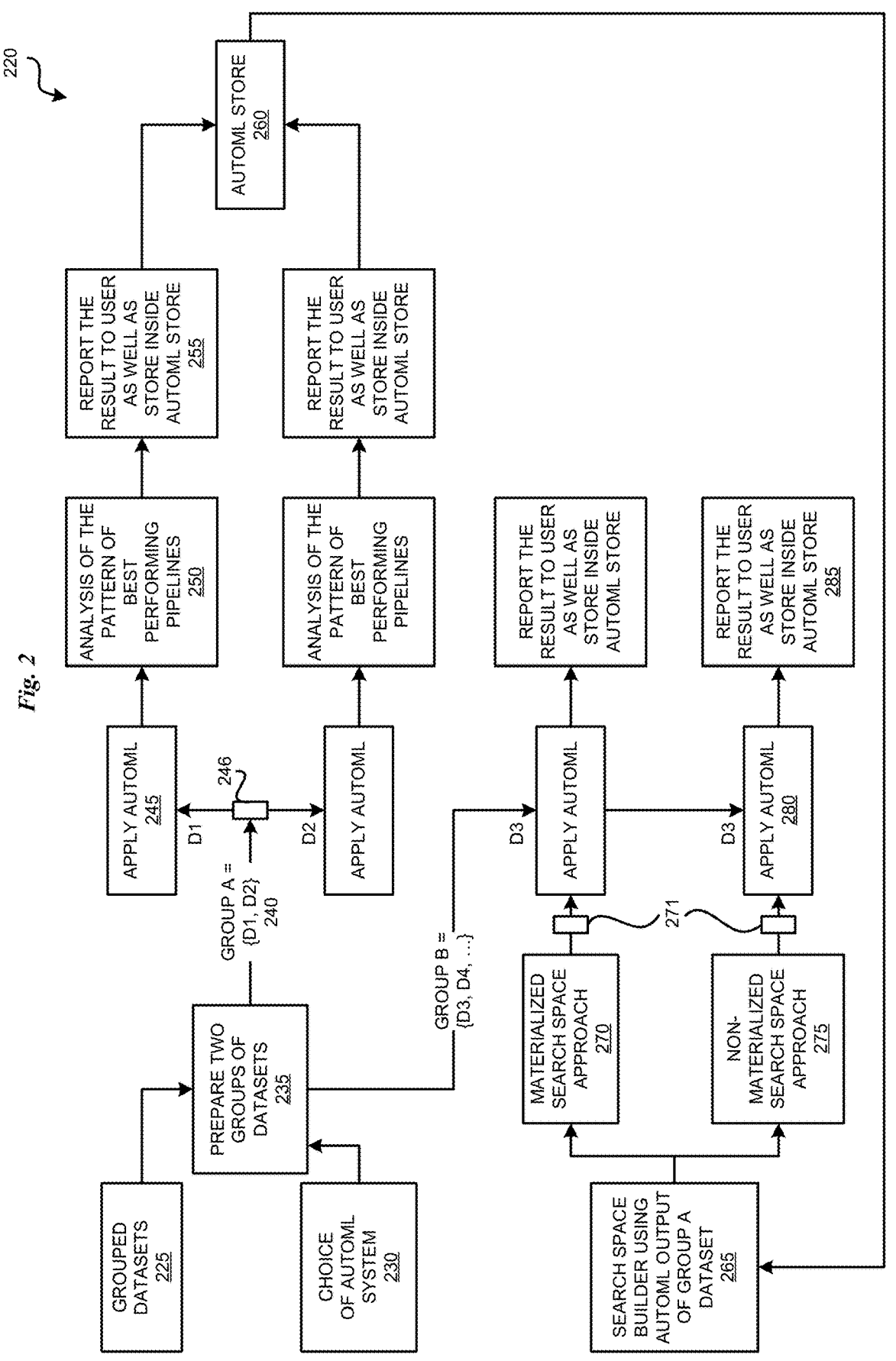
FIG. 2 depicts a block diagram of a model exploration of grouped datasets system in accordance with an illustrative embodiment.

FIG. 2 depicts a block diagram of a model exploration of grouped datasets system in an environment in accordance with an illustrative embodiment. In a particular embodiment, the diagram 220 shows aspects of the application 200 of FIG. 1.

In the illustrated embodiment, a grouped datasets 225 is received by the system. In embodiments, the datasets may comprise of data collected from monitoring network component such as GitHub issue, and ticket system such as JIRA and ServiceNow SNOW in a variety of data formats including Extensible Markup Language (XML), binary stream, hexadecimal, Hypertext Markup Language (HTML) and other structured and unstructured data formats. For example, a set of datasets may include multiple datasets be used for large language model or image processing but each dataset in the set may or may not share the same attributes.

A component of the system prepares two sets of datasets 235 from a group of datasets i.e. a first dataset and a second dataset. The system receives a choice of an automated modeler 230 such as an AutoML process. For example, AutoML processes are implemented for classification, regression, forecasting, computer vision, and natural language processing and may include but is not limited to SROM's AutoReg, AutoAI's Regression, and TPOT's TPOTRegressor or similar. In some examples, the type of AutoML process chosen is based on the type and use of the desired model but is agnostic to any AutoML process.

In an embodiment, the first dataset and the second dataset are created by performing a skyline operation of a feature dimension extracted from the group of datasets comprising establishing a dimensional space by applying a data centric approach, a model centric approach, a joint approach, joining of the data centric approach and the model centric approach, or a user-controlled approach. It should be noted that the first dataset may in embodiments comprise of a group of one or more datasets. Similarly, the second dataset may in embodiments comprise of a group of one or more datasets. In embodiments, a skyline operation may refer to a known computation given a dataset, a skyline operation returns the objects that cannot be dominated by any other objects. In other words, the skyline operation optimizes a dimensional first dataset in that the first dataset contains the data that are not dominated by any other data on all dimensions. In some embodiments, the first dataset is smaller than the second dataset. For example, the first dataset may contain less data records and/or points. In another example, if the first dataset comprises of a group of one or more datasets, the first dataset may contain fewer datasets than the second dataset.

In embodiments, the data centric approach comprise uses features extracted from the dataset. Note that, some features may be extracted only if the underlying problem is for example classification. The table below list some of these features:

| Feature Id | Feature Description |
| --- | --- |
| 1 | ratio of number of attribute to the number of instance |
| 2 | ratio of the number of categorical columns to the number of numeric columns |
| 3 | list of frequencies of each distinct class |
| 4 | total no. of attributes |
| 5 | total no. of binary columns |
| 6 | no. of categorical columns |
| 7 | no. of distinct class |
| 8 | no. of instances |
| 9 | no. of numeric columns |
| 10 | ratio of the number numeric column to the number of categorical columns |
| 11 | Entropy of class proportions |
| 12 | Multi-class imbalance ratio |
| 13 | chance of label shift in training data |
| 14 | dataset dimensionality |

In some embodiments, the model centric approach depends on the AutoML system. This module needs probing of the AutoML system. The model centric features are defined with respect to the AutoML system as every AutoML system uses some pre-defined list of estimators and transformers. For example, the directed acyclic graph (DAG) of AutoReg defines the search space for estimators and transformers. Since this feature extractions are probing based, different machine learning systems will have different behavior mostly depends on the dataset characteristics and its variation. In some examples, if these features are unable to be extracted, the features are initialized with default values. The table below lists some examples:

| Feature Id | Model |
| --- | --- |
| 1 | Estimator 1 Score |
| 2 | Estimator 2 Score |
| . . . | . . . |
| N | Estimator n Score |
| N + 1 | Avg. Rank of Tree based Model |
| N + 2 | Avg. Rank of Booster based Model |
| N + 3 | Avg. Rank of Linear Models |
| N + 4 | . . . |
| N + 5 | Transformer 1 is used or not: True or False |

In an embodiment, the first dataset 240 and the selected automated modeler such as an AutoML process are received by an automated modeler orchestrator component 246 of the system which orchestrates the execution of the chosen automated modeler with the first dataset or if the first dataset 240 is a group of datasets, applying or executing the selected automated modeler process on each of the datasets 245. In embodiments, the automated modeler orchestrator component may be configured to connect, instantiate, deploy, execute and/or orchestrate the automated modeling of the datasets in multiple automated modeler compute nodes in serial or in parallel depending on factors such as system resources and/or priority of the task. In some embodiments, the orchestration may occur in real time for example when the automated modeler orchestrator component receives a notification that an input to the automated modeler is ready for processing. The automated modeler orchestrator component may connect to an automated modeler compute node over a network or shared memory.

In some embodiments, the automated modeler orchestrator component may update an event notification message by writing to a memory buffer shared with the other components of the system. For example, the event notification message may be a binary word or bits to update the status of the automated modeler process task. In another example, the event notification message may be a binary word to indicate the progress of applying an automated modeler process on a dataset of the group of datasets.

In an embodiment, the output of the automated modeling process on the first dataset comprises a pipeline metric. In embodiments, the pipeline metric is stored in a pipeline store, for example, in an AutoML store 255 and/or reported by the system to the user. In some embodiments, the pipeline store 260 may be a data store including but not limited to a relational database, non-relational database, object store, or any digital repository that stores and safeguards the information in computer systems. The pipeline store may be network-connected storage, distributed cloud storage, a physical hard drive, or virtual storage. It can store both structured data like information tables and unstructured data like emails, images, and videos.

In some embodiments, the pipeline metric may comprise of the results of performing by a component that performs analysis of the pattern of best performing pipelines 250. For instance, the result may comprise a) estimator-wise performances (length 1 pipelines); b) pipeline performances (>1 pipelines) which is the performance of the workflow multiple sequential steps that do everything from data extraction and preprocessing to model training and deployment; c) maximum length of pipelines in top-k best performing pipelines; d) important transformers; and e) failed estimators (length 1 pipelines). An estimator-wise performance refers to how well a model, called an "estimator," is able to accurately predict or estimate unknown parameters based on the given data, typically measured using metrics like accuracy, precision, recall, or other relevant evaluation criteria depending on the task (classification or regression) involved. To evaluate an estimator's performance, its predictions may be compared on a test dataset to the actual known values, using metrics such as: accuracy: proportion of correct predictions for classification tasks; precision: proportion of positive predictions that are actually correct; recall: proportion of actual positive cases that are correctly predicted as positive; f1-score: harmonic mean of precision and recall, useful when class imbalances exist; a mean squared error (MSE): for regression tasks, measures the average squared difference between predicted and actual values.

In embodiments, consumable output summary is generated to report a commonality between type of estimators that fail, report a commonality between type of estimators that tend to perform better, and report pipelines that benefits from doing parameter tuning with performance gain.

In embodiments, the search space builder component 265, responsive to the event notification message, creates a search space according to a criterion of the pipeline store. In the context of machine learning, a search space is an implicitly- or explicitly-defined collection of machine learning pipelines, among which to search for a suitable solution to a given machine learning problem. The search space in any given machine learning system ultimately defines which solutions are possible at all.

In embodiments, the search space builder component 265 creates the search space as a weighted graph. In some examples, the weighted graph is a DAG. Compared to general graphs, DAGs possess an inherent layer-wise structure with intricate node inter-dependencies that can significantly influence the overall graph properties. In logic synthesis, for example, minor structural alterations in lower layers can propagate errors to higher layers, resulting in substantial functional differences. Modeling these layer-wise structural features of DAGs requires specially designed model architectures and generation mechanisms.

In embodiments, creating a graph database comprises a central processing unit that allocates memory that is typically managed through a combination of on-heap memory for active data access and off-heap memory for storing the graph's topology and indexes, allowing for efficient traversal and query execution. The number of nodes and relationships directly impacts memory usage. Highly connected graphs can consume more memory due to the increased number of relationships. In some embodiments, using counts, familiarity metrics reduces the need for the creation of nodes and relationships.

The search space builder component 265, for example, may create the search space using a materialized search space approach 270. Each node is an estimator or transformer, the weight of node is a function of time it comes in top-performing pipeline for many datasets as well as many pipelines of same dataset. The weight of an edge is defined in similar manner, for each path, a feasibility can also be constrained. In an embodiment, the criterion of the pipeline metric comprises weighing the node and the edge of the weighted graph according to an estimator performance and a transformer performance. Such a determination may be made by analyzing the pipeline metrics in the pipeline store and ranking the performances. For example, the search space builder component may extract historical pipeline metrics from the pipeline store and create the search space from ranking the pipeline metric together with the historical pipeline metrics. Common evaluation metrics depend on the specific problem but may include accuracy, precision, recall, F1-score, mean squared error or others.

In some embodiments, the automated modeler orchestrator component orchestrates 271 the execution of an automated modeler 280 according to the search space and the second dataset. For example, the automated modeler orchestrator component may orchestrate the automated modeler according to the materialized search space approach 270. In another example, the automated modeler orchestrator component may orchestrate the automated modeler according to a non-materialized approach 275. In this instance, a scoring model is provided to the automated modeler instead of providing which estimator or transformer to be used. The scoring model helps the automated modeler to judge the performance of a pipeline to be executed and if the expected performance is above the desired one, the automated modeler can execute the pipeline. The scoring model may be a simple regression model derived using the previously explored first dataset and its parameters. In embodiments, the resulting model/pipeline is stored in the pipeline store and/or reported to the user 285.

In embodiments, the system may implement a machine learning algorithm such as gradient boosting which is an ensemble machine learning technique that combines a collection of weak models into a single, more accurate and efficient predictive model. These weak models are typically decision trees, which is why the algorithms are commonly referred to as gradient boosted decision trees (GBDTs). Gradient boosting algorithms work iteratively by adding new models sequentially, with each new addition aiming to resolve the errors made by the previous ones. The final prediction of the aggregate represents the sum of the individual predictions of all the models. Gradient boosting combines the gradient descent algorithm and boosting method, with a nod to each component included in its name.

In embodiments, the system may comprise machine learning models. In embodiments, machine learning models may comprise of a supervised learning model where the labeled data sets comprise attributes of historical data requests. As input data is fed into the model, it adjusts its weights until the model has been fitted appropriately. In an embodiment, the input data comprises training text, documents and images. For example, the documents may be historical attribute metrics of historical responses to data requests with associated confidence ratings. Supervised learning uses a training set to teach models to yield the desired output. This training dataset includes inputs and correct outputs, which allow the model to learn over time.

In some embodiments, the machine learning models comprise of an unsupervised learning model that is given raw unlabeled historical data requests. In embodiments, the model infers similarities and differences of the response attributes of the historical data requests based on known methods such as clustering, association and dimensional reduction. It should be noted that in some embodiments, the machine learnings models may comprise of supervised and unsupervised learning models in combination.

In an embodiment, a feature vector represents an entity of a dataset in a vector format where each element of the vector comprises a feature such as a particular attribute's occurrences in the data request. In another embodiment, a feature vector comprises properties of the entities representing the patterns in the entities. For example, the feature vectors may comprise response attributes of a plurality of historical entities. The system performs matrix operations on a large amount of the data represented in the feature vectors to determine patterns in the data.

In an embodiment, the machine learning model implements linear regression is used to identify the relationship between a dependent variable and one or more independent variables and is typically leveraged to make predictions about future outcomes. When there is only one independent variable and one dependent variable, it is known as simple linear regression. As the number of independent variables increases, it is referred to as multiple linear regression. For each type of linear regression, it seeks to plot a line of best fit, which is calculated through the method of least squares. However, unlike other regression models, this line is straight when plotted on a graph.

In another embodiment, the machine learning model implements a Random forest model is a commonly-used machine learning algorithm, that combines the output of multiple decision trees to reach a single result. Random forests are made up of many decision trees, each of which is trained using a random subset of the training data. For example, a decision tree may be trained on a data request specific to a particular industry or organization. Random forest is used for both classification and regression purposes. The "forest" references a collection of uncorrelated decision trees, which are then merged together to reduce variance and create more accurate data predictions.

In some embodiments, the machine learning model may implement a deep learning model where the input layer of the deep learning model processes and passes the data request and response attributes to layers further in the neural network. These hidden layers process information at different levels, adapting their behavior as they receive new information.

Figure 3:
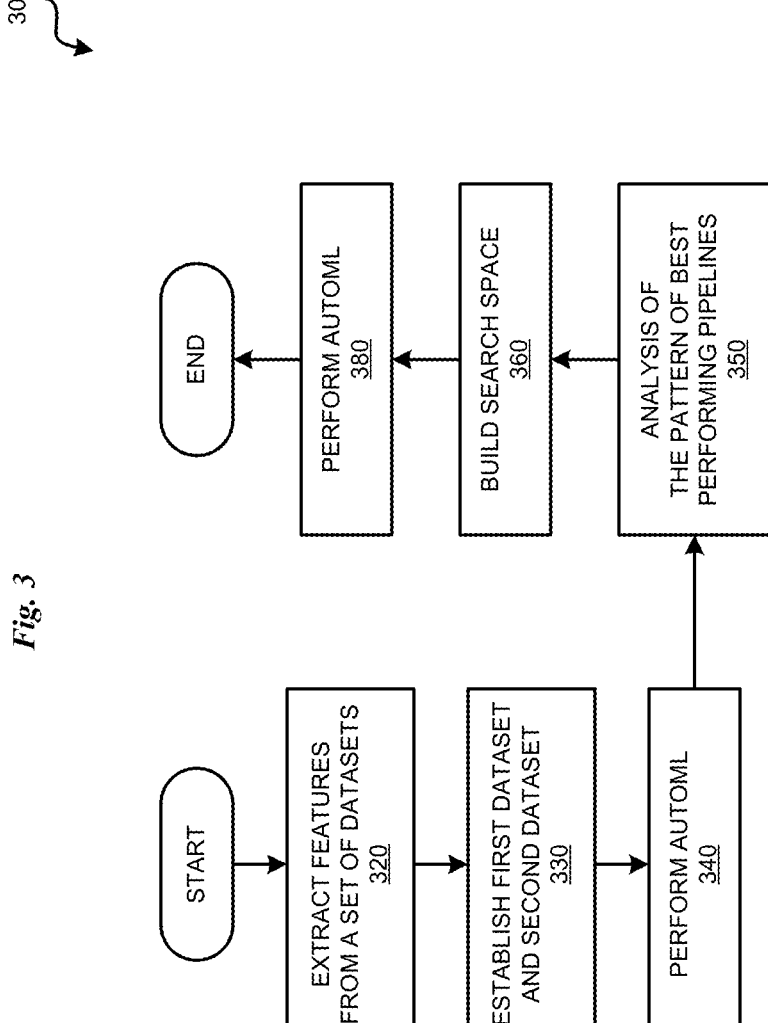
FIG. 3 depicts a flowchart of a model exploration of grouped datasets in accordance with an illustrative embodiment.

FIG. 3 depicts a flowchart of a model exploration of grouped datasets in accordance with an illustrative embodiment. In a particular embodiment, the components of the diagram 300 shows aspects of the application 200 of FIG. 1.

In the illustrated embodiment, at step 320 a feature is extracted from a group of datasets. At step 330, the first dataset and the second dataset are established by performing a skyline operation of a feature. At step 340, the first dataset and the selected automated modeler such as an AutoML process are received by an automated modeler orchestrator component of the system which orchestrates the execution of the chosen automated modeler with the first dataset. At step 350, analysis of the best performing pipelines is performed. In some embodiments, the analysis may comprise analyzing the pipeline metric as explained above. The pipeline metric is stored in a pipeline store. At step 360, the search space is created according to a criterion of the pipeline store where the criterion may comprise weighing the node and the edge of the weighted graph according to an estimator performance and a transformer performance. At step 380, the automated modeler orchestrator component orchestrates the execution of an automated modeler according to the search space and the second dataset according to the materialized search space approach. In another embodiment, the automated modeler orchestrator component orchestrates the execution of an automated modeler according to the search space and the second dataset according to the non-materialized approach as explained above. In embodiments, the output for instance a pipeline metric is stored in a pipeline store and/or presented to a user through a GUI. The process then ends.

FIG. 4 depicts a use case diagram of a model exploration of grouped datasets in accordance with an illustrative embodiment. In a particular embodiment, the system components 400 are representative of aspects of the application 200 of FIG. 1.

In the illustrated embodiment, a representation of the group of datasets 420 generated during semiconductor fabrication is shown. In the examples, a group of datasets, where each group may consist of up to (467) datasets, may comprise of (10) separate types of features, each numbering thousands of columns. The lot Group 1 comprise a dataset group for no underlying logic condition, the lot Group 2 comprise a dataset group for a full build condition, and Group 3 comprises a dataset group for experimental conditions. Each wafer may comprise of top metallization layers, memory layers, and underlying logic 440. The system described in embodiments described herein for example, may be used to model different types of semiconductor fabrication datasets to predict measurements of the top metallization layers. In another example, the embodiments may also be used to classify different conditions of the semiconductor fabrication process.

Figure 5:
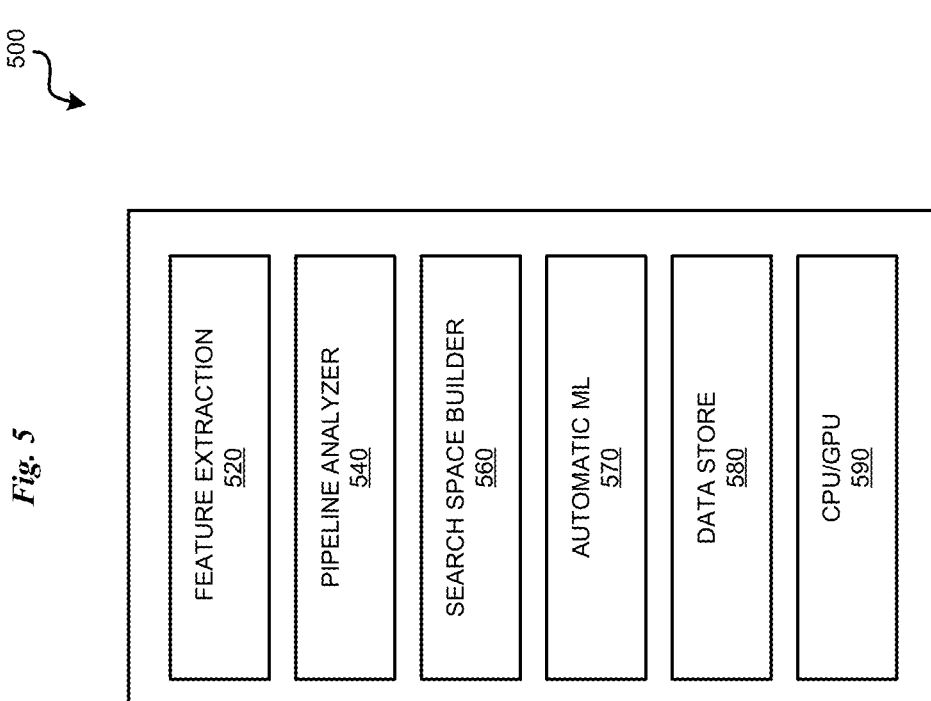
FIG. 5 depicts a system diagram of a model exploration of grouped datasets system in accordance with an illustrative embodiment.

FIG. 5 depicts a system diagram of a model exploration of grouped datasets system in accordance with an illustrative embodiment. In a particular embodiment, the system components 500 are representative of aspects of the application 200 of FIG. 1.

In the illustrated embodiment, a system comprises a feature extraction component 520, a pipeline analyzer component 540, a search space builder component 560, an automatic ML component 570, a data store 580, and a central processing unit (CPU) 590. In an embodiment, the feature extraction component 520 and the automatic ML component 570 may also comprise a network component that comprises a router, network card, switch, a network interface card and related software. In another embodiment, the automatic ML component 570 may comprise orchestration components such as load balancing, graphics processing units (GPU) fractioning, batching and autoscaling. The network component may also include data aggregation layer that interacts with another component in the system. The automatic ML component 570 may further comprise a neural network with an encoder-decoder architecture accepting input feature vectors to the machine learning model to perform predictions. GPU due to their ability to process tasks simultaneously, may be used for training the neural networks. By conducting numerous calculations at the same time, they can greatly decrease the processing time needed for the large volumes of data that machine learning models use. Tensor Processing Units, on the other hand, created specifically for executing machine learning tasks. Their ability to provide increased efficiency and speed while working with neural networks makes them a transformative technology for training machine learning models.

In embodiments, the data store 580 may be a graph database which is a systematic collection of data that emphasizes the relationships between the different data entities or nodes. The graph database may use mathematical graph theory to show data connections. In other embodiments, the data store 580 may be a relational database. Unlike relational databases, which store data in rigid table structures, graph databases store data as a network of entities and relationships. In some embodiments, the functionality described herein is distributed among a plurality of systems, which can include combinations of software and/or hardware-based systems, for example Application-Specific Integrated Circuits (ASICs), computer programs, or smart phone applications.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:

creating, by a system, a first dataset and a second dataset from a group of datasets by performing a skyline operation of a machine learning feature extracted from the group of datasets, the skyline operation creating the first dataset and the second dataset wherein the first dataset and the second dataset each comprises data that are not dominated by another machine learning feature;

updating a pipeline metric, wherein the pipeline metric is a measurement of a process of an automated machine learning modeler, in a pipeline store by orchestrating the automated machine learning modeler based on the first dataset wherein responsive to the updating an event notification message is transmitted;

detecting that the pipeline metric has been stored in the pipeline store based on the event notification message; and responsive to the event notification message, creating a search space according to a criterion applied to the pipeline store wherein the criterion is based on ranking the pipeline metric together with historical pipeline metrics and orchestrating the automated machine learning modeler according to the search space and the second dataset wherein the system models the first dataset and the second dataset individually and the second dataset is modelled based in part on the pipeline metric.

2. The computer-implemented method of claim 1, wherein creating the search space further comprises extracting historical pipeline metrics from the pipeline store and creating the search space from the historical pipeline metrics.

3. The computer-implemented method of claim 1, wherein orchestrating the automated machine learning modeler with a scoring model wherein the scoring model is derived from the pipeline metric.

4. The computer-implemented method of claim 1, wherein the search space comprises a weighted graph wherein the criterion applied to the pipeline store comprises weighing a node and an edge of the weighted graph according to a machine learning estimator performance and a machine learning transformer performance.

5. The computer-implemented method of claim 1, wherein the event notification message comprises a binary word of a shared memory buffer.

6. The computer-implemented method of claim 1, further comprising establishing a dimensional space by applying a data centric approach, a model centric approach, a joint approach or a user-controlled approach.

7. The computer-implemented method of claim 1, wherein the first dataset is smaller than the second dataset and comprises optimized dimensions of the group of datasets.

8. A computer program product comprising one or more computer readable storage media, and program instructions collectively stored on the one or more computer readable storage media, the program instructions executable by a processor to cause the processor to perform operations comprising:

creating, by a system, a first dataset and a second dataset from a group of datasets by performing a skyline operation of a machine learning feature extracted from the group of datasets, the skyline operation creating the first dataset and the second dataset wherein the first dataset and the second dataset each comprises data that are not dominated by another machine learning feature;

updating a pipeline metric, wherein the pipeline metric is a measurement of a process of an automated machine learning modeler, in a pipeline store by orchestrating the automated machine learning modeler based on the first dataset wherein responsive to the updating an event notification message is transmitted;

detecting that the pipeline metric has been stored in the pipeline store based on the event notification message; and responsive to the event notification message, creating a search space according to a criterion applied to the pipeline store wherein the criterion is based on ranking the pipeline metric together with historical pipeline metrics and orchestrating the automated machine learning modeler according to the search space and the second dataset wherein the system models the first dataset and the second dataset individually and the second dataset is modelled based in part on the pipeline metric.

9. The computer program product of claim 8, wherein creating the search space further comprises extracting historical pipeline metrics from the pipeline store and creating the search space from the historical pipeline metrics.

10. The computer program product of claim 8, wherein orchestrating the automated machine learning modeler with a scoring model wherein the scoring model is derived from the pipeline metric.

11. The computer program product of claim 8, wherein the search space comprises a weighted graph wherein the criterion applied to the pipeline store comprises weighing a node and an edge of the weighted graph according to a machine learning estimator performance and a machine learning transformer performance.

12. The computer program product of claim 8, wherein the event notification message comprises a binary word of a shared memory buffer.

13. The computer program product of claim 8, further comprising establishing a dimensional space by applying a data centric approach, a model centric approach, a joint approach or a user-controlled approach.

14. The computer program product of claim 8, wherein the first dataset is smaller than the second dataset and comprises optimized dimensions of the group of datasets.

15. A computer system comprising a processor and one or more computer readable storage media, and program instructions collectively stored on the one or more computer readable storage media, the program instructions executable by the processor to cause the processor to perform operations comprising:

creating, by a system, a first dataset and a second dataset from a group of datasets by performing a skyline operation of a machine learning feature extracted from the group of datasets, the skyline operation creating the first dataset and the second dataset wherein the first dataset and the second dataset each comprises data that are not dominated by another machine learning feature;

updating a pipeline metric, wherein the pipeline metric is a measurement of a process of an automated machine learning modeler, in a pipeline store by orchestrating the automated machine learning modeler based on the first dataset wherein responsive to the updating an event notification message is transmitted;

detecting that the pipeline metric has been stored in the pipeline store based on the event notification message; and responsive to the event notification message, creating a search space according to a criterion applied to the pipeline store wherein the criterion is based on ranking the pipeline metric together with historical pipeline metrics and orchestrating the automated machine learning modeler according to the search space and the second dataset wherein the system models the first dataset and the second dataset individually and the second dataset is modelled based in part on the pipeline metric.

16. The computer system of claim 15, wherein creating the search space further comprises extracting historical pipeline metrics from the pipeline store and creating the search space from the historical pipeline metrics.

17. The computer system of claim 15, wherein orchestrating the automated machine learning modeler with a scoring model wherein the scoring model is derived from the pipeline metric.

18. The computer system of claim 15, wherein the search space comprises a weighted graph wherein the criterion applied to the pipeline store comprises weighing a node and an edge of the weighted graph according to a machine learning estimator performance and a machine learning transformer performance.

19. The computer system of claim 15, wherein the event notification message comprises a binary word of a shared memory buffer.

20. The computer system of claim 15, further comprising establishing a dimensional space by applying a data centric approach, a model centric approach, a joint approach or a user-controlled approach.

* * * * *